(12) United States Patent
Barnes et al.

(10) Patent No.: US 11,353,670 B2
(45) Date of Patent: Jun. 7, 2022

(54) OPTICAL FIBER SPLICE ENCLOSURE

(71) Applicant: Prysmian S.p.A., Milan (IT)

(72) Inventors: Andrew Paul Barnes, Milan (IT); Kris Jonathan Roberts, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 17/021,692

(22) Filed: Sep. 15, 2020

(65) Prior Publication Data

US 2021/0080666 A1    Mar. 18, 2021

(30) Foreign Application Priority Data

Sep. 16, 2019   (IT) .......................... 102019000016418

(51) Int. Cl.
   *G02B 6/44*   (2006.01)

(52) U.S. Cl.
   CPC ......... *G02B 6/4442* (2013.01); *G02B 6/4452* (2013.01); *G02B 6/4454* (2013.01)

(58) Field of Classification Search
   CPC .............................. G02B 6/4442; G02B 6/4454
   See application file for complete search history.

(56) References Cited

U.S. PATENT DOCUMENTS

| | | |
|---|---|---|
| 4,924,034 A | 5/1990 | Truesdale et al. |
| 5,692,299 A | 12/1997 | Daems et al. |
| 5,790,739 A * | 8/1998 | Strause ................ G02B 6/4442 385/135 |
| 6,014,490 A * | 1/2000 | Canning .............. G02B 6/4442 385/134 |
| 6,542,688 B1 * | 4/2003 | Battey ................. G02B 6/4442 385/135 |
| 7,045,710 B1 | 5/2006 | Allen et al. |
| 7,697,812 B2 * | 4/2010 | Parikh ................. G02B 6/4446 385/135 |

FOREIGN PATENT DOCUMENTS

WO    WO-2021004612 A1 *  1/2021  ........... G02B 6/4454

* cited by examiner

*Primary Examiner* — Sung H Pak
(74) *Attorney, Agent, or Firm* — Slater Matsil, LLP

(57) ABSTRACT

An optical fiber splice enclosure includes a cap enclosing an inner volume, the cap having an access opening for accessing the inner volume. The enclosure includes a base removably attached to the access opening of the cap, the base having one or more ports for access of optical cables into the inner volume, and a fiber routing frame mounted on the base and arranged into the inner volume. The enclosure includes a tubular element arranged in the inner volume and surrounding the fiber routing frame. The tubular element has a first edge portion and a second edge portion, the tubular element including first retaining elements arranged at the first edge portion, and second retaining elements arranged at the second edge portion. The tubular element includes a bottom tubular portion proximate to the base, a top tubular portion distal to the base, and one or more frangible lines.

17 Claims, 5 Drawing Sheets

OPTICAL FIBER SPLICE ENCLOSURE

CROSS-REFERENCE TO RELATED APPLICATIONS

This application claims the benefit of Italian Patent Application No. 102019000016418 filed on Sep. 16, 2019, which application is hereby incorporated herein by reference.

TECHNICAL FIELD

The present invention relates to the field of optical cable connections within an optical access network. In particular, the present invention relates to an optical fiber splice enclosure.

BACKGROUND

Optical access networks provide a number of end customers with broadband communication services from operators, i.e. with services requiring data transmission at a very high rate, for example of some Mbit/s.

Optical fiber splice enclosures provide a protected room for cable connections in optical access networks. In fact, optical fiber splice enclosures comprise a rigid elongated dome-shaped cap removably mounted on a base, thereby enclosing an inner volume. The base has cable ports for optical cables to enter and exit the inner volume through the base. Once optical cables, usually comprehensive of a bundle of optical fibers, have entered the inner volume, the optical fibers may be managed individually, or they may still be kept together in the form of cables.

A fiber routing frame is mounted on the base and is arranged inside the inner volume. The frame may have several different arrangements of supports for routing and connection of optical cables and optical fibers, such as a stack of parallel and rotatable fiber routing trays. Still, loose cables or fibers emerging from the supports toward the base are often cluttered together.

The cap protects adequately the fibers while the enclosure is closed and operative. However, insertion of the cap over the frame, for mounting on the base, may prove to be dangerous for the fibers, which risk to be caught by the cap, and thus bent or damaged, in any case with a signal interruption or a reduction of signal quality. Accordingly, any maintenance operation may cause users to be temporarily disconnected from the network.

Moreover, opening and closing of the enclosure can be quite frequent just for fault detection issues, since the internal cables are not visible from outside.

U.S. Pat. No. 7,045,710 describes an enclosure for telecommunication lines and splices. A housing defines an internal cavity extending in a longitudinal direction, and a base member is configured for separable attachment to an open first end of the housing. A support frame secured to the base, within the internal cavity of the housing, includes at least one portion that provides support about substantially the entire circumference of the internal cavity at a location between the first end and the second end of the housing. The support protects critical telecommunication lines and minimizes deflection of the housing.

SUMMARY

In an optical fiber splice enclosure includes a cap enclosing an inner volume, the cap having an access opening for accessing the inner volume. The enclosure includes a base removably attached to the access opening of the cap, the base having one or more ports for access of optical cables into the inner volume, and a fiber routing frame mounted on the base and arranged into the inner volume. The enclosure includes a tubular element arranged in the inner volume and surrounding the fiber routing frame. The tubular element has a first edge portion and a second edge portion, the tubular element including first retaining elements arranged at the first edge portion, and second retaining elements arranged at the second edge portion. The first retaining elements and second retaining elements being configured to be mutually coupled for retaining together the first edge portion and the second edge portion. The tubular element includes a bottom tubular portion proximate to the base, a top tubular portion distal to the base, and one or more frangible lines releasably connecting the top tubular portion to the bottom tubular portion.

BRIEF DESCRIPTION OF THE DRAWINGS

The present invention will now be described in more detail hereinafter with reference to the accompanying drawings, in which embodiments of the invention are shown.

DETAILED DESCRIPTION OF ILLUSTRATIVE EMBODIMENTS

Figure 1:
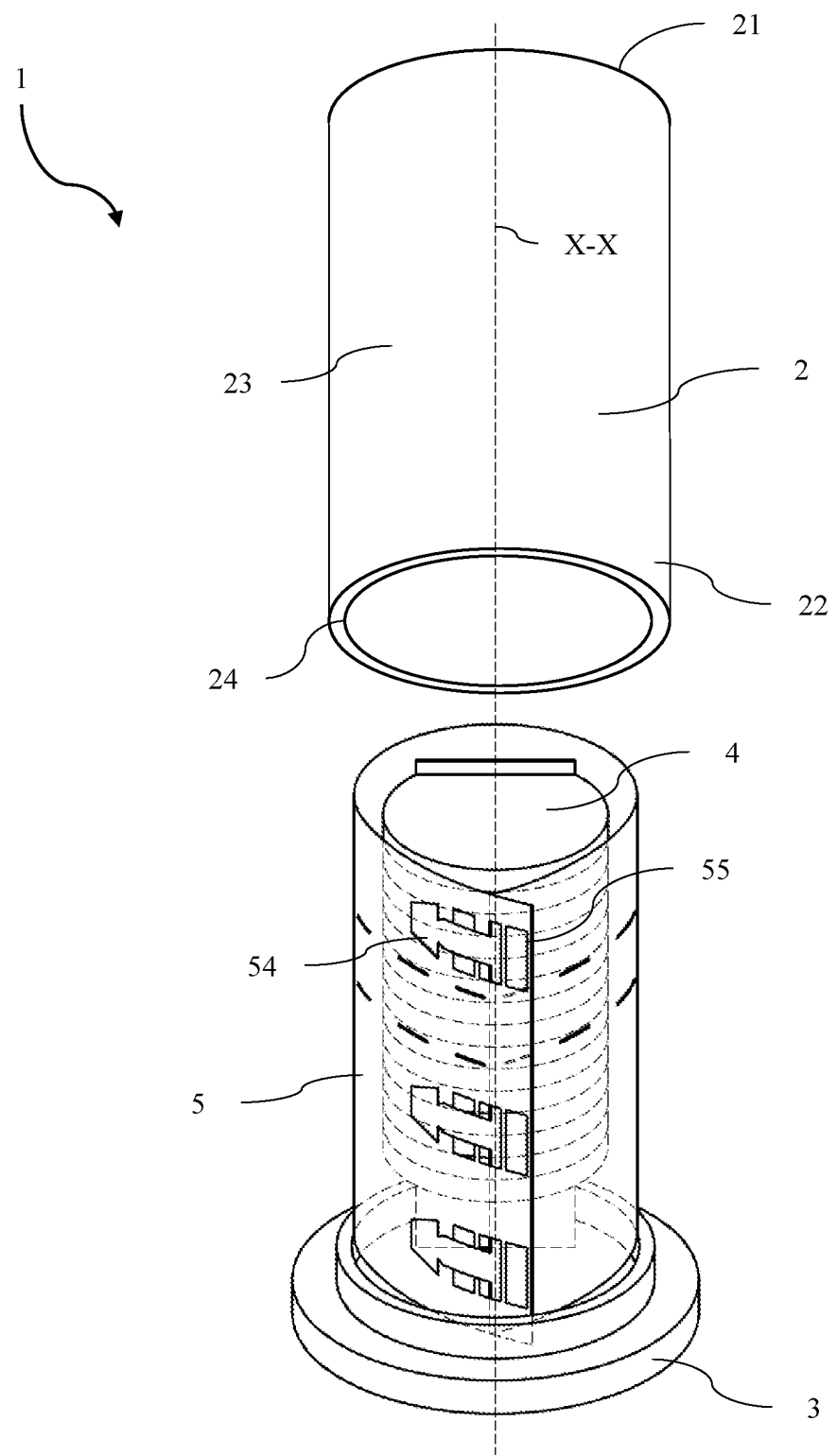
FIG. 1 is a perspective view of a fiber splice enclosure according to one embodiment of the invention, before a cap is mounted on a base.

Embodiments of the present invention prevent cable damage during opening and closing of enclosures of different sizes, without complicating maintenance operations.

The Applicant has found that a tubular element can be arranged in the inner volume and surround the fiber routing frame. Two edge portions of the tubular element are retained together by means of first and second retaining elements, preferably in the form of protrusions and slots, arranged at a first edge portion and a second edge portion for retaining the edge portions together. Accordingly, the tubular element can be easily removed and reinstalled when the enclosure is open. Thus, cables will be surrounded by the tubular element and thereby protected from catching into the cap.

Moreover, one or more frangible lines releasably connect a top tubular portion and a bottom tubular portion. This provides for adaptation of the tubular element to caps and fiber routing frames with different dimensions, as one of the tubular portions may be detached for adjusting the length of the tubular element.

Therefore, one aspect of the present invention relates to an optical fiber splice enclosure, comprising a cap enclosing an inner volume, the cap having an access opening for accessing the inner volume. A base is removably attached to the access opening of the cap, the base having one or more ports for access of optical cables into the inner volume. A fiber routing frame is mounted on the base and arranged into the inner volume, and a tubular element is arranged in the inner volume and surrounds the fiber routing frame. The tubular element has a first edge portion and a second edge portion, wherein the tubular element comprises first retaining elements arranged at the first edge portion, and second retaining elements arranged at the second edge portion, the first retaining elements and second retaining elements being configured to be mutually coupled for retaining together the first edge portion and the second edge portion. The tubular element comprises a bottom tubular portion proximate to the base, a top tubular portion distal to the base, and one or more frangible lines releasably connecting the top tubular portion to the bottom tubular portion.

Preferably, the tubular element has two opposite end openings spaced apart along a longitudinal direction. Moreover, the bottom tubular portion and the top tubular portion are separable along the one or more frangible lines for adjusting a length of the tubular element in the longitudinal direction.

Preferably, the first retaining elements are spaced apart in the longitudinal direction along the first edge portion and the second retaining elements are spaced apart in the longitudinal direction along the second edge portion.

Preferably, the first retaining elements comprise one or more bottom first retaining elements arranged on the bottom tubular portion, and one or more top first retaining elements arranged on the top tubular portion, and the second retaining elements comprise one or more bottom second retaining elements arranged on the bottom tubular portion, and one or more top second retaining elements arranged on the top tubular portion.

Preferably, the one or more frangible lines extend mainly along a winding direction which extends around the tubular element from the second edge portion towards the first edge portion.

Preferably, each frangible line comprises a plurality of perforations.

Preferably, each frangible line comprises one or more unperforated groove.

Preferably, each first retaining element comprises a protrusion and each second retaining element comprise a slot configured for receiving and retaining a protrusion.

Preferably, each protrusion has a free end portion with a first width, and a connecting portion arranged between the free end portion and the first edge portion of the tubular element, the connecting portion having a second width smaller than the first width.

Preferably, each slot has a slot width which is smaller than the first width and greater than the second width.

Preferably, the first edge portion has a first edge, the protrusions being connected to the first edge.

Preferably, the slots are arranged in slot arrays, whereby a protrusion is configured to be received selectively in each slot of a slot array for adjusting a distance between the first edge portion and the second edge portion.

Preferably, the slots of each slot array are spaced apart in a winding direction.

Preferably, each protrusion is aligned in the winding direction with a corresponding slot array.

Preferably, the tubular element is made of a flexible, preferably transparent, sheet.

Preferably, the protrusions are formed as protruding portions of the flexible sheet.

Preferably, the flexible sheet is made of a PET based material, preferably Polyethylene Terephthalate Glycol.

Preferably, the flexible sheet has a thickness from 0.4 mm to 1 mm.

Figure 2:
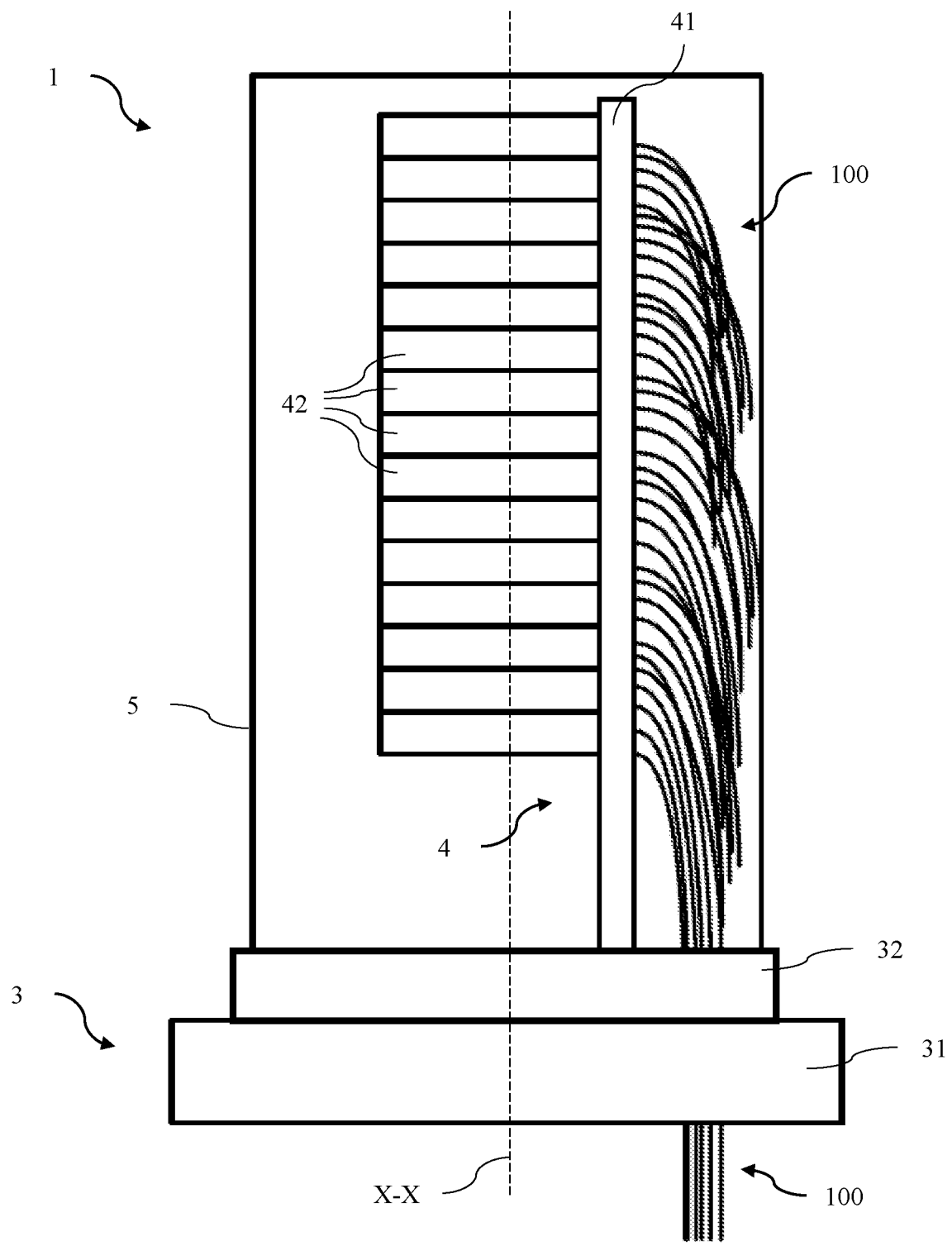
FIG. 2 is a side view of the enclosure of FIG. 1, without the cap.
Figure 3:
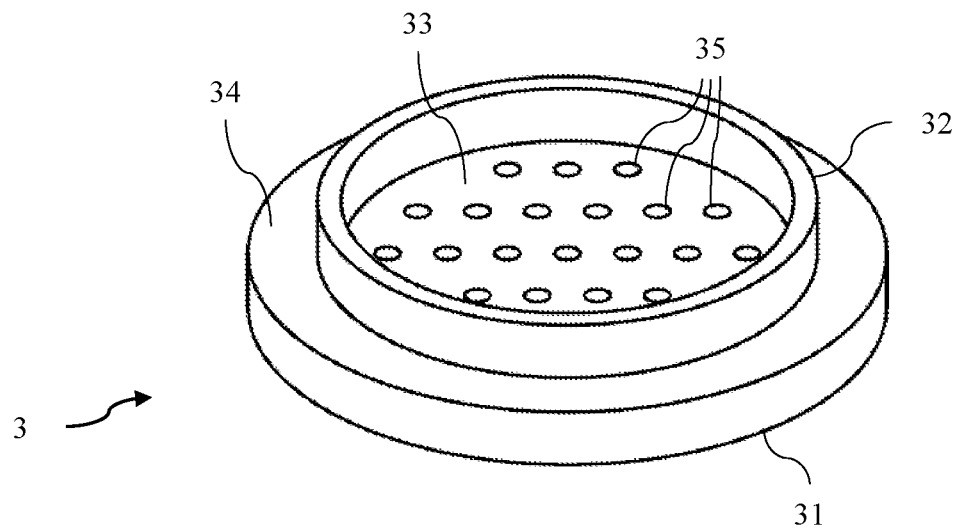
FIG. 3 is a perspective view of the base of the enclosure of FIG. 1.
Figure 4:
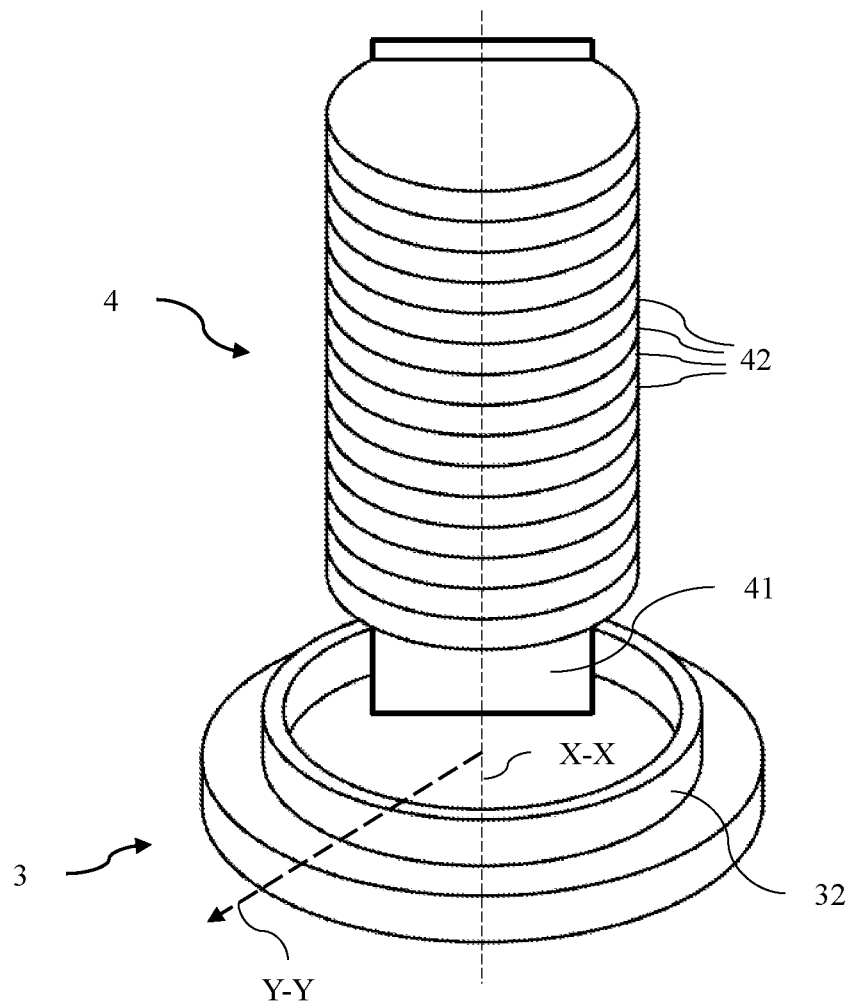
FIG. 4 is a perspective view of the base and a fiber routing frame of the enclosure of FIG. 1.
Figure 5:
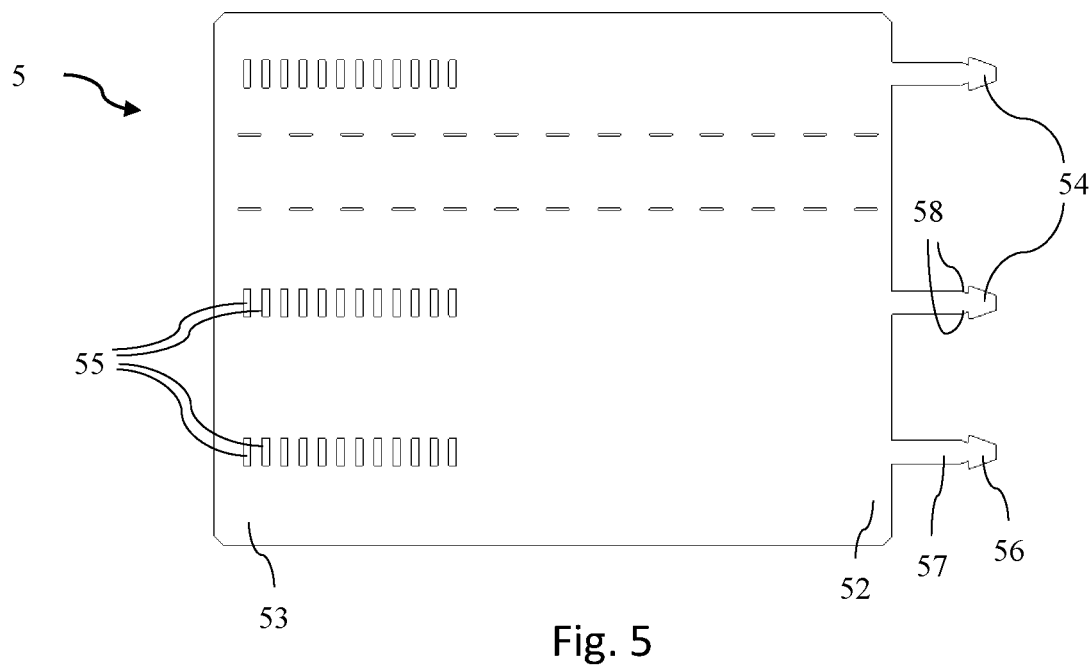
FIG. 5 is a perspective view of a flexible sheet laying flat for subsequent folding into a tubular element of the enclosure of FIG. 1.
Figure 6:
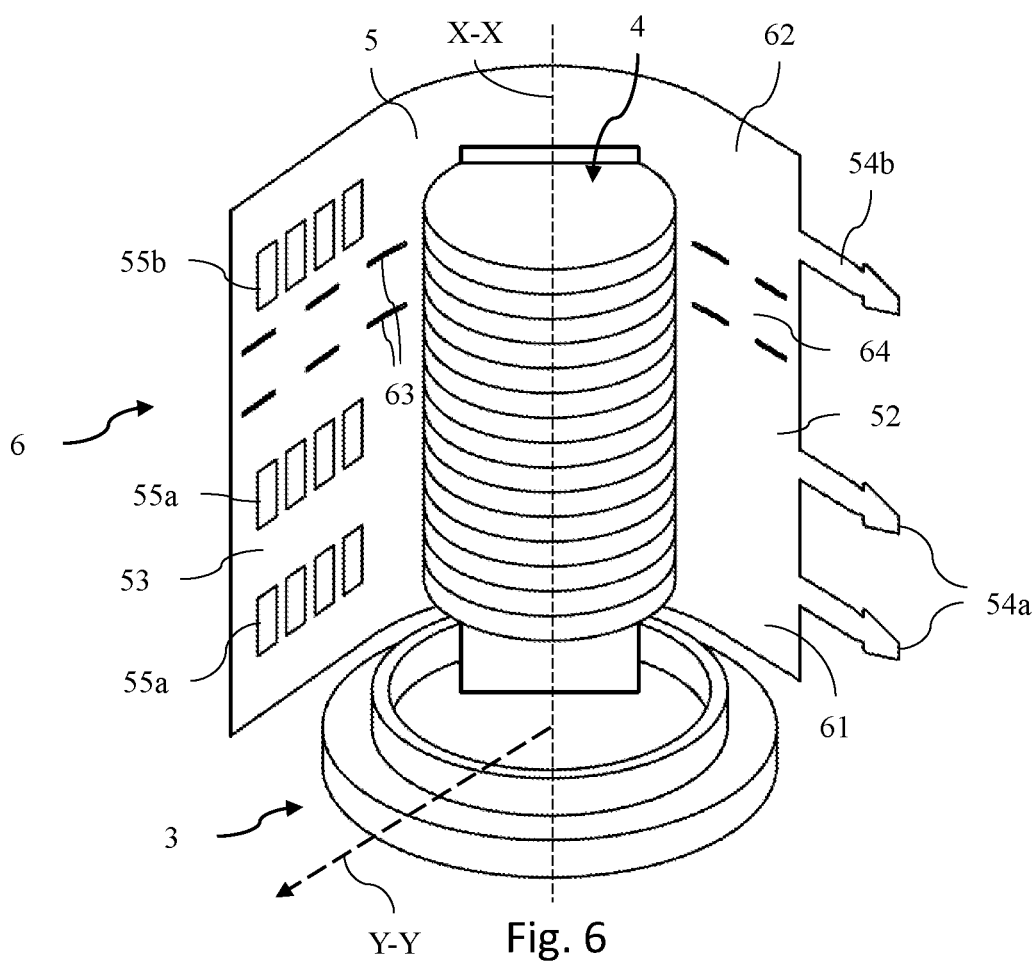
FIG. 6 is a perspective view of the enclosure of FIG. 1, without the cap, while the tubular element is not completely folded around the frame.
Figure 7:
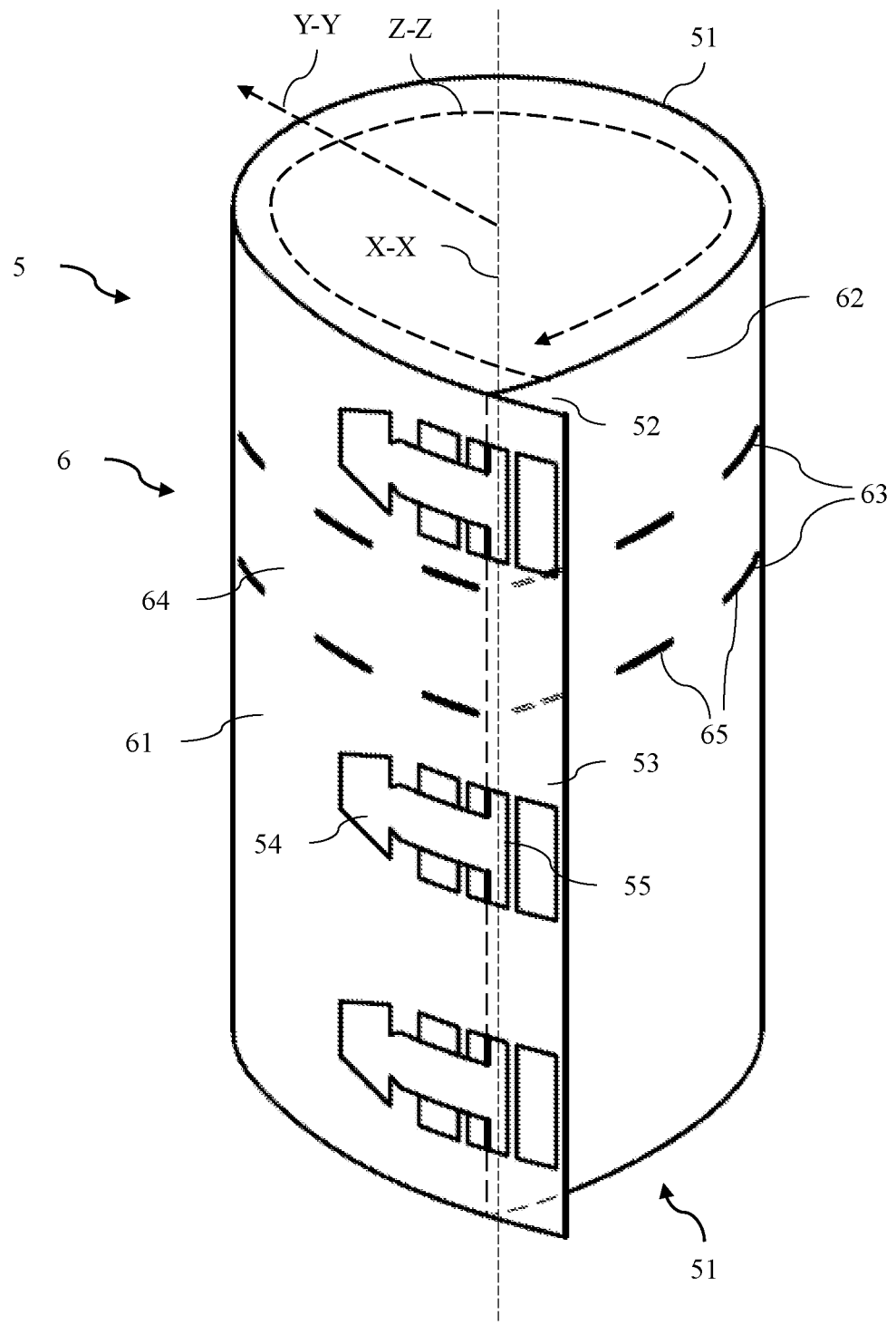
FIG. 7 is a perspective view of the tubular element of the enclosure of FIG. 1.

FIGS. 1-7 show an optical fiber splice enclosure 1. The enclosure 1 comprises a cap 2 and a base 3. The cap 2 is removably attached to the base 3, and projects from the base 3 in a longitudinal direction X-X, which during use coincides preferably with a vertical direction. In the embodiment of the figures, the cap 2 extends mainly in the longitudinal direction X-X.

The cap 2 encloses an inner volume. In more detail, the cap 2 has a closed end portion 21 and an open end portion 22, which are spaced apart in the longitudinal direction X-X. The cap 2 further comprises a side wall 23 extending from the closed end portion 21 to the open end portion 22 and surrounding the inner volume. The shape of the cap 2 can be for example cylindrical or prismatic.

The cap 2 has an access opening 24 for accessing the inner volume. The access opening 24 is formed in the open end portion 22. The base 3 is removably attached to the access opening 24 for closing and opening the inner volume. In the following, the enclosure 1 will be mainly described with reference to the closed configuration, i.e. with the base 3 attached to the cap 2 and closing the access opening 24.

The base 3 comprises a main panel 31, such as a disk panel, arranged perpendicularly to the longitudinal direction X-X. The base 3 comprises also a rim 32 surrounding a central portion 33 of the main panel 31. The rim 32 protrudes from the main panel 31 in the longitudinal direction X-X, inside the inner volume.

The main panel 31 has a flange 34 defining a border of the base 3. The flange 34 is arranged around the central portion 33, and outwardly with respect to the rim 32, in a radial direction Y-Y extending perpendicular to the longitudinal direction X-X from the inside to the outside of the inner volume. When in the closed configuration, the cap 2 bears on the flange 34, externally to the rim 32.

The base 3 has one or more ports 35 for access of optical cables 100 into the inner volume. The ports 35 are formed in the main panel 31, preferably in the central portion 33 thereof. Each port 35 extends around a respective port axis oriented in the longitudinal direction X-X. The ports 35 are visible especially in FIG. 3, while they have been omitted in the other figures. The cables instead are represented only schematically in FIG. 2.

The enclosure 1 further comprises a fiber routing frame 4 mounted on the base 3, protruding from the base 3, and arranged into the inner volume. The frame 4 extends mainly in the longitudinal direction X-X. It is to be noted that, upon removal of the cap 2 from the base 3, the frame 4 is intended to be retained attached to the base 3.

The frame 4 comprises supports for routing and connection of the optical cables 100 entering in the inner volume through the ports 35 of the base 3. For example, in the embodiment of the figures the fame 4 comprises an upright 41 fixed to the base 3, in detail at the central portion 33 of the base 3, and a stack of splice trays 42 connected to the upright 41. The splice trays 42 are mutually spaced in the longitudinal direction X-X, and preferably each splice tray 42 is arranged perpendicular to the longitudinal direction X-X. More preferably, the splice trays 42 are hinged to the upright 41.

The enclosure 1 comprises a tubular element 5, which is preferably made of a flexible sheet. The tubular element 5 is arranged in the inner volume and surrounds the fiber routing frame 4. Moreover, the tubular element 5 surrounds the optical cables 100 extending between the frame 4 and the ports 35 of the base 3. In more detail, the tubular element 5 surrounds a protected volume arranged inside the inner volume, and the fiber routing frame 4 is arranged inside the protected volume. However, the tubular element 5 is preferably independent from the fiber routing frame 4.

According to one embodiment, the tubular element 5 is transparent, for enabling inspection of the optical cables 100 inside the protected volume. The applicant has found that the use of a PET based material, and especially Polyethylene Terephthalate Glycol, is particularly well suited for the tubular element 5. Moreover, the flexible sheet of the tubular element 4 has preferably a thickness from 0.4 mm to 1 mm.

The tubular element 5 extends mainly in the longitudinal direction X-X, and in detail the tubular element 5 has two opposite end openings 51 spaced apart along the longitudinal direction X-X. Preferably, the tubular element 5 has a longitudinal extent not lower than 80% of a longitudinal extent of the fiber routing frame 4, and more preferably substantially equal.

The tubular element 5 may have, for example, cylindrical or prismatic shape. In one embodiment, the tubular element 5 bears on the central portion 33 of the base 3, internally to the rim 32. However, the tubular element 5 may be also spaced apart from the base 3 in the longitudinal direction X-X.

The tubular element 5 has a first edge portion 52 with a first edge, and a second edge portion 53 with a second edge. Both the first and the second edge portions 52, 53 extend mainly in the longitudinal direction X-X and, preferably, to the opposite end openings 51 of the tubular element 5.

When the tubular element 5 is arranged around the fiber routing frame 4, the first edge portion 52 and the second edge portion 53 are arranged close to each other. In fact, in the preferred embodiment the first edge portion 52 and the second edge portion 53 overlap each other. For example, the first edge portion 52 may be arranged internally or externally with respect to the second edge portion 53, when the radial direction Y-Y is considered. Otherwise, a gap may be arranged between the first edge portion 52 and the second edge portion 53, transversal to the radial direction Y-Y.

Such a tubular element 5 can be obtained by folding a substantially flat flexible sheet and bringing close to each other two opposite edge portions thereof. The flexible sheet is represented before folding in FIG. 5, and partially folded around the fiber routing frame 4 in FIG. 6. Before folding, the sheet is preferably substantially rectangular. Two of the opposing sides of the sheet will correspond to the first and second edge or the tubular element 5, and the remaining two opposing sides of the sheet will correspond to the end openings 51 of the tubular element 5.

The tubular element 5 comprises first retaining elements 54 arranged at the first edge portion 52, and second retaining elements 55 arranged at the second edge portion 53. The first retaining elements 54 are configured to be coupled with the second retaining elements 55 for retaining together the first edge portion 52 and the second edge portion 53.

According to one embodiment, each first retaining element 54 comprises a protrusion and each second retaining element 55 comprise a slot configured for receiving and retaining a protrusion. However, a skilled person may provide for retaining elements 54, 55 of different nature.

Preferably, the protrusions 54 are formed as protruding portions of the flexible sheet. Moreover, each protrusion 54 extends mainly in a winding direction Z-Z which extends around the tubular element 5 from the second edge portion 53 towards the first edge portion 52. In further detail, the protrusions 54 are connected to, and projects from, the first edge of the first edge portion 52.

In a preferred embodiment, each protrusion 54 is shaped substantially as an arrow. In fact, each protrusion 54 has a free end portion 56, or head portion, having a first width, which is preferably measured in the longitudinal direction X-X. Moreover, each protrusion 54 has a connecting portion 57, or neck portion, arranged between the free end portion 56 and the first edge portion 52 of the tubular element 5. The free end portion 56 tapers away from the connecting portion 57. Furthermore, the connecting portion 57 has a second width smaller than the first width. Optionally, the connecting portion 57 also has two opposite indentations 58 adjacent to the free end portion 56. The indentations 58 are spaced apart in the longitudinal direction X-X.

Each slot 55 extends mainly in the longitudinal direction X-X. For the purpose of retaining the protrusions 54, each slot 55 has a slot width which is smaller than the first width and greater than the second width. It is to be noted that the free end portions 56 can be inserted into the slots 55 thanks to the flexibility of the protrusions 54, and with a further facilitation due to their tapered shape. However, after insertion the width of the free end portions 56 will prevent extraction thereof from the slots 55, unless the free end portions 56 are flexed again by a user for this purpose. Therefore, such embodiment is advantageous in easiness of connection and disconnection of slots 55 and protrusions 54, without compromising stable positioning of the tubular element 5.

The first retaining elements 54 are spaced apart in the longitudinal direction X-X along the first edge portion 52. Moreover, each first retaining element 54 is aligned in the winding direction Z-Z with a corresponding second retaining element 55. Therefore, at least some of the second retaining elements 55 are spaced apart in the longitudinal direction X-X along the second edge portion 53.

In the embodiment with slots and protrusions, the slots are preferably arranged in slot arrays. The slot arrays are spaced apart in the longitudinal direction X-X along the second edge portion 53. Instead, the slots of each slot array are spaced apart in the winding direction Z-Z.

In this case, each protrusion is aligned in the winding direction Z-Z with a corresponding slot array. Moreover, each protrusion is configured to be received selectively in each slot of a corresponding slot array for adjusting a distance between the first edge portion 52 and the second edge portion 53, preferably in the winding direction Z-Z. Such distance will be adjusted both in case of the first and second edge portions 52, 53 overlapping, and in case of a gap being present between the first and second edge portions 52, 53. Correspondingly, a cross section area of the protected volume is adjusted and, preferably, an area of a cross section of the protected volume which is perpendicular to the longitudinal direction X-X. Therefore, the tubular element 5 may be adjusted for more and less large frames 4.

The enclosure 1 comprises height adjusting members 6 for adjusting a length of the tubular element 5 in the longitudinal direction X-X. This advantageously makes the tubular element 5 adaptive to enclosures 1 having caps 2 and/or frames 4 with different longitudinal dimensions, while still surrounding substantially entirely the frame 4, and therefore providing adequate protection to the cables 100.

Preferably, the tubular element 5 comprises a bottom tubular portion 61 proximate to the base 3 and a top tubular portion 62 distal to the base 3. Accordingly, the top tubular portion 62 and the bottom tubular portion 61 are spaced in the longitudinal direction X-X.

In this embodiment the height adjusting members 6 comprise one or more frangible lines 63 releasably connecting the top tubular portion 61 to the bottom tubular portion 62. The frangible line 63 is formed in the tubular element 5, and in particular in the flexible sheet. In case a plurality of frangible lines 63 are provided, the tubular element 5 comprises at least one intermediate tubular portion 64 arranged between the top tubular portion 61 and the bottom tubular portion 62, and between at least two frangible lines 63.

Each frangible line 63 extends preferably in the winding direction Z-Z, from the first edge portion 52 to the second edge portion 53. In the preferred embodiment each frangible line 63 comprises a plurality of perforations. The perforations may be for example a series of through cuts 65 aligned in the winding direction Z-Z, each cut 65 extending in the winding direction Z-Z as shown in the figures, or alternatively a series of point-shaped holes aligned in the winding direction Z-Z.

However, other embodiments of the frangible lines 63 could be envisaged, such as one or more grooves not perforating the flexible sheet, for example a unique grove extending in the winding direction Z-Z or a series of aligned grooves. In such embodiments each frangible line define a weakened portion in the flexible sheet.

In any case, the flexible sheet will be configured to be torn or cut along any frangible line 63 for separating the top tubular portion 61 and the bottom tubular portion 62, thereby leaving only one of such portions 61, 62 around the frame 4 and thus reducing the longitudinal extent of the tubular element 5.

It is to be noted that in this embodiment the protrusions 54 comprise one or more bottom first retaining elements 54a, for example bottom protrusions, arranged on the bottom tubular portion 61, and one or more top first retaining elements 54b, for example top protrusions, arranged on the top tubular portion 62. Correspondingly, the second retaining elements 55 comprise one or more bottom second retaining elements 55a, for example bottom slots, arranged on the bottom tubular portion 61, and one or more top second retaining elements 55b, for example top slots, arranged on the top tubular portion 62. Further first and second retaining elements 54, 55 can be formed in any intermediate tubular portion 64.

Therefore, even in case some tubular portion 61, 62, 64 is removed, at least one remaining tubular portion, which is preferably at least the bottom tubular portion 61, has still one or more first and second retaining elements 54, 55, and therefore stable connection between the first and second edge portions 52, 53 is still guaranteed, as well as connection and disconnection easiness.

In the preferred embodiment, there is a plurality of bottom first and second retaining elements 54a, 55a, in particular two bottom protrusions and two bottom slots, while only one top first retaining element 54b and one top second retaining element 55b, in particular one top protrusion and one top slot, are required. This further improves stability since the bottom first and second retaining elements 54a, 55a remaining after removal of the top tubular portion 62 are still plural.

What is claimed is:

1. An optical fiber splice enclosure comprising:
a cap enclosing an inner volume, the cap having an access opening for accessing the inner volume;
a base removably attached to the access opening of the cap, the base having one or more ports for access of optical cables into the inner volume;
a fiber routing frame mounted on the base and arranged into the inner volume; and
a tubular element arranged in the inner volume and surrounding the fiber routing frame, the tubular element having a first edge portion and a second edge portion, the tubular element comprising
first retaining elements comprising protrusions arranged at the first edge portion, and
second retaining elements comprising slot arrays arranged at the second edge portion, the first retaining elements and second retaining elements being configured to be mutually coupled for retaining together the first edge portion and the second edge portion,
wherein the tubular element comprises a bottom tubular portion proximate to the base, a top tubular portion distal to the base, and one or more frangible lines releasably connecting the top tubular portion to the bottom tubular portion, wherein the one or more frangible lines extend mainly along a winding direction which extends around the tubular element from the second edge portion towards the first edge portion, wherein each of the first retaining elements comprises one of the protrusions, wherein each of the second retaining elements comprises a plurality of slots arranged in each row of the slot arrays, wherein each of the protrusions is configured to be received selectively in each of the plurality of slots for adjusting a distance between the first edge portion and the second edge portion, and wherein the slots of each of the slot arrays are spaced apart in the winding direction.

2. The enclosure of claim 1, wherein the tubular element has two opposite end openings spaced apart along a longitudinal direction, the bottom tubular portion and the top tubular portion being separable along the one or more frangible lines for adjusting a length of the tubular element in the longitudinal direction.

3. The enclosure of claim 2, wherein the first retaining elements are spaced apart in the longitudinal direction along the first edge portion, and the second retaining elements are spaced apart in the longitudinal direction along the second edge portion.

4. The enclosure of claim 1, wherein the first retaining elements comprise one or more bottom first retaining elements arranged on the bottom tubular portion, and one or more top first retaining elements arranged on the top tubular portion, and the second retaining elements comprise one or more bottom second retaining elements arranged on the bottom tubular portion, and one or more top second retaining elements arranged on the top tubular portion.

5. The enclosure of claim 1, wherein each protrusion is aligned in the winding direction with a corresponding slot array.

6. The enclosure of claim 1, wherein each frangible line comprises a plurality of perforations.

7. The enclosure of claim 1, wherein each frangible line comprises one or more unperforated groove.

8. An optical fiber splice enclosure comprising:
a cap enclosing an inner volume, the cap having an access opening for accessing the inner volume;
a base removably attached to the access opening of the cap, the base having one or more ports for access of optical cables into the inner volume;

a fiber routing frame mounted on the base and arranged into the inner volume; and a tubular element arranged in the inner volume and surrounding the fiber routing frame, the tubular element having a first edge portion and a second edge portion, the tubular element comprising first retaining elements arranged at the first edge portion, and second retaining elements arranged at the second edge portion, the first retaining elements and second retaining elements being configured to be mutually coupled for retaining together the first edge portion and the second edge portion, wherein the tubular element comprises a bottom tubular portion proximate to the base, a top tubular portion distal to the base, and one or more frangible lines releasably connecting the top tubular portion to the bottom tubular portion, wherein each first retaining element comprises a protrusion and each second retaining element comprises a slot configured for receiving and retaining a protrusion, wherein the slots have a length along a direction perpendicular to the one or more frangible lines and a width along the one or more frangible lines, the length being longer than the width, wherein the slots are arranged in slot arrays, wherein a protrusion is configured to be received selectively in each slot of a slot array for adjusting a distance between the first edge portion and the second edge portion.

9. The enclosure of claim 8, wherein each protrusion has a free end portion having a first width, and a connecting portion arranged between the free end portion and the first edge portion of the tubular element, the connecting portion having a second width smaller than the first width.

10. The enclosure of claim 9, wherein each slot has a slot width which is smaller than the first width and greater than the second width.

11. The enclosure of claim 8, wherein the first edge portion has a first edge, the protrusions being connected to the first edge.

12. The enclosure of claim 8, wherein the tubular element is made of a flexible sheet, wherein the protrusions are formed as protruding portions of the flexible sheet.

13. An optical fiber splice enclosure comprising:

a cap enclosing an inner volume, the cap having an access opening for accessing the inner volume;

a base removably attached to the access opening of the cap, the base having one or more ports for access of optical cables into the inner volume;

a fiber routing frame mounted on the base and arranged into the inner volume; and a tubular element arranged in the inner volume and surrounding the fiber routing frame, the tubular element having a first edge portion and a second edge portion, the tubular element comprising first retaining elements arranged at the first edge portion, and second retaining elements arranged at the second edge portion, the first retaining elements and second retaining elements being configured to be mutually coupled for retaining together the first edge portion and the second edge portion, wherein the tubular element comprises a bottom tubular portion proximate to the base, a top tubular portion distal to the base, and one or more frangible lines releasably connecting the top tubular portion to the bottom tubular portion, wherein the tubular element is made of a flexible sheet, the second retaining elements in the second edge portion being all of the second retaining elements in the tubular element, the bottom tubular portion comprising a first subset of the second retaining elements and the top tubular portion comprising a remaining second subset of the second retaining elements, the first subset having more second retaining elements than the second subset.

14. The enclosure of claim 13, wherein the flexible sheet is transparent.

15. The enclosure of claim 13, wherein the flexible sheet is made of a PET based material.

16. The enclosure of claim 13, wherein the flexible sheet is made of Polyethylene Terephthalate Glycol.

17. The enclosure of claim 13, wherein the flexible sheet has a thickness from 0.4 mm to 1 mm.

* * * * *